Jan. 26, 1960  J. R. BARR  2,922,542
GASKET JOINT STRUCTURE AND METHOD OF MAKING THE SAME
Filed Aug. 20, 1957
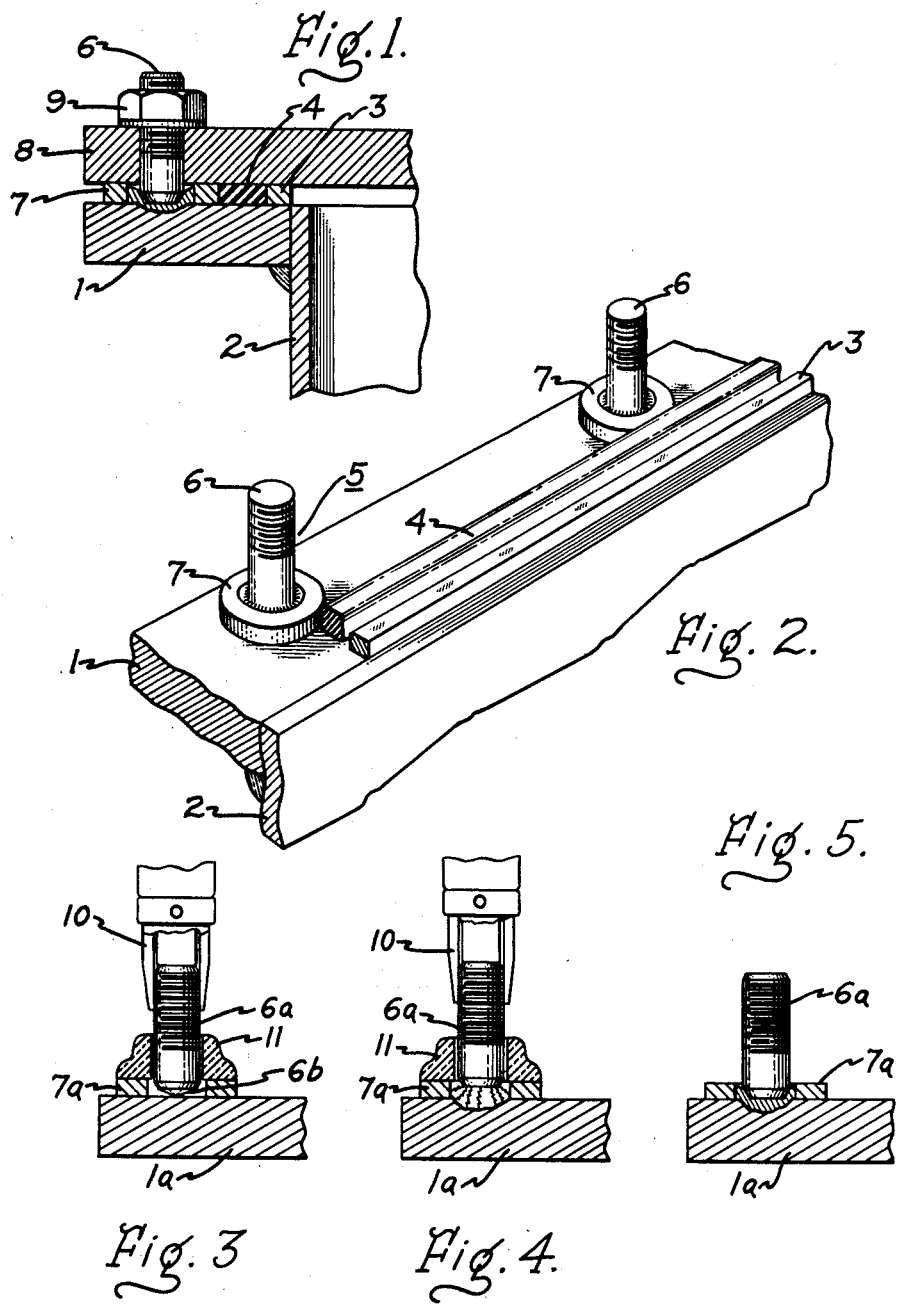
Inventor,
James R. Barr,
by Gilbert P. Tarleton
His Attorney.

United States Patent Office 2,922,542
Patented Jan. 26, 1960

2,922,542

GASKET JOINT STRUCTURE AND METHOD OF MAKING THE SAME

James R. Barr, Rome, Ga., assignor to General Electric Company, a corporation of New York Application August 20, 1957, Serial No. 679,294

4 Claims. (Cl. 220—46)

The present invention relates to a joint construction, and more particularly relates to a fluid-tight gasketed joint having a combined stud and gasket spacer assembly and to a method of making the same.

In sealing openings in containers or tanks such as transformer casings, in which fluid dielectrics, e.g. liquid or gas, are contained, it is common practice to position a resilient gasket along the edge of the opening, the gasket being compressed by clamping against it a suitable cover plate or other closure member. Experience has shown that in order to obtain optimum gasket life, especially in the case of synthetic rubber gaskets which are widely used, such as nitrile rubber, the gasket should be compressed from 25% to 45% of its original thickness. Greater compression causes the gasket to deteriorate more rapidly whereas less compression will not afford a reliable seal.

To ensure adequate gasket compression while still avoiding excessive pressure, it has been the practice to provide greater clamping force than necessary but to limit the actual compression by the use of metal stops secured to one of the surfaces to be joined. In some cases a groove is provided in one of the surfaces for receiving the gasket, the depth of the groove being such that the gasket protrudes only the amount which it is to be compressed. However, the provision of such a gasket groove is often expensive and is not always practical, as, for example in the case where the parts to be clamped together are relatively thin.

In many cases, the gasket is placed between spaced parallel metal strips which act as compression limiting stops, and threaded studs or the like are welded at intervals to the base plate adjacent the spacer strip-gasket arrangement for clamping the joint surfaces together, or the clamping studs are arranged alternatively in a row of spacer buttons. Such procedures, however, entail the use of an excessive number of parts and numerous welding operations, and are relatively expensive and time consuming.

It is an object of the invention to provide a gasketed-joint arrangement which avoids the disadvantages of known structures of this type.

It is another object of the invention to provide a combined stud and gasket spacing arrangement for a joint structure and a method of making the same which is simple and economical to carry out.

Other objects and advantages will become apparent from the following description and appended claims.

With the above objects in view, the invention relates to a gasketed joint structure comprising a pair of rigid cooperating surfaces adapted to be clamped together, compressible gasket means arranged on one of the rigid surfaces and adapted to be compressed therebetween to form a tight seal, and a combined clamping and spacing means secured to one of the rigid surfaces for clamping the surfaces together while limiting the compression of the gasket therebetween.

In a typical embodiment of the invention the combined clamping and spacing means includes a threaded stud and spacing collar or washer surrounding the stud at its base, the stud and collar being jointly welded to one of the rigid surfaces.

The invention will be better understood from the following description taken in conjunction with the accompanying drawing, in which:

Fig. 1 is a fragmentary sectional view of a gasketed joint arrangement in accordance with the invention;

Fig. 2 is a perspective view of a portion of the joint structure showing the unitary welded stud and spacer assembly; and Figs. 3, 4 and 5 show various stages in the procedure of making the present stud and spacer assembly.

Referring now to the drawing and more particularly to Figs. 1 and 2, there is shown a portion of a gasketed closure constructed in accordance with the invention comprising a base plate 1 forming part of or attached to a casing 2, such as a transformer tank or other container. Attached to plate 1 is a metal or other type of non-compressible spacing strip 3 which is spot-welded or otherwise suitably fixed to the surface of the base plate 1. Secured adjacent to spacing strip 3 is a gasket 4 of compressible material, such as nitrile rubber or other suitable resilient sealing material. On the side of gasket 4 opposite spacing strip 3 there is arranged a row of combined stud and spacer units 5 formed in accordance with the invention, each unit comprising a threaded stud 6 and spacer ring or collar 7 both secured to the plate 1 in a manner more fully described hereinafter. To provide a fluid-tight closure joint, a cover plate 8 having suitable apertures for passage of studs 6, as shown in Fig. 1, is arranged over base plate 1 and the adjacent surfaces of plates 1 and 8 are forced toward each other in clamping relation by means of nut 9 threaded on each stud 6. As will be observed from Figs. 1 and 2, the height of spacer strip 3 and of spacer rings 7 is about the same, whereas the height of uncompressed gasket 4 is greater than the spacer members, the difference in height being the amount it is desired to compress the gasket 4. After the nut 9 is tightened sufficiently to bring the surface of plate 8 into engagement with spacers 3 and 7, the latter members serve as stops to prevent additional compression of gasket 4 upon further tightening of nut 9.

In accordance with the invention, the stud 6 and spacer ring 7 are secured to the base plate in a single operation to form a combined stud and spacer assembly. Preferably, the spacer ring 7 has an inner diameter substantially larger than the diameter of the stud 6 and with the stud 6 and ring 7 placed in desired position on the base plate 1 and the stud located within the ring substantially concentric therewith, the stud and ring are simultaneously welded to the plate. Stud welding procedures using known stud welding guns are conventional in the art, and in carrying out the joint welding process involved in the present invention such known welding guns may be conveniently, though not necessarily, employed. Welding guns of this type are shown, for example, in United States Patents 2,260,969 and 2,315,502, but any other suitable apparatus could be used if desired.

Figs. 3, 4 and 5 show the successive steps involved in a method carried out in accordance with the invention. Shown in Fig. 3 is the initial arrangement of stud 6a and spacer collar 7a resting on the plate 1a to which they are to be welded. As illustrated in Fig. 3, stud 6a may be of the known flux-containing type incorporating a flux material which acts to remove impurities from the weld area or protects the molten metal from oxidation during the forming of the weld. For this purpose, stud 6a is equipped at its lower end with a small container 6b which holds the flux particles and which releases the flux in molten form during the welding operation.

The stud 6a is held in position by the welding gun, only the chuck portion 10 of which is shown in the drawing, the stud being held thereby in electrical and mechanical connection with the welding gun. An annular ceramic shield or ferrule 11 is arranged encircling the stud 6a between the gun portion 10 and the spacer ring 7a, the ferrule being held by gravity or other means against ring 7a. As is noted from the drawing, the ferrule 11 fits rather closely around the stud 6a and serves to prevent access of air to the weld area, to confine the molten material to the weld area, and to prevent upward discharge of gases during the welding operation. However, the use of the ferrule is not absolutely essential in carrying out the present method.

Upon actuation of the gun, an electric current is caused to flow through the stud 6a to plate 1a, and chuck 10 thereafter retracts stud 6a away from plate 1a, thus creating electrical arcs extending from the stud to both spacer ring 7a and plate 1a, as shown in Fig. 4, and resulting in portions of the stud 6a, spacer ring 7a and plate 1a being melted. The stud 6a is then plunged by chuck 10 into the molten metal pool thus produced, which immediately solidifies and forms a strong permanent weld fixedly and jointly securing the stud 6a and spacer collar 7a to the base plate 1a. The gun is removed and the expendable ferrule 11 broken off, leaving the welded stud and spacer assembly shown in Fig. 5.

To obtain optimum results in the above operation, the spacing collar aperture should be sufficiently larger than the stud diameter to provide adequate space for the molten metal to flow between the stud 6a and spacing collar 7a and form a good weld therebetween. Also, the amount the stud 6a is retracted should be carefully regulated so that arcing occurs both between the stud and the spacing collar, and between the stud and the plate, substantially as shown in Fig. 4.

There is thus provided by the present invention a novel arrangement of clamping stud and gasket spacer which is economically and conveniently produced, and which combines in one unit and one operation an assembly which heretofore required a plurality of separate units and steps, the invention thereby making possible substantial savings in time, labor and expense.

While the present invention has been described with reference to particular embodiments there, it will be understood that numerous modifications may be made by those skilled in the art without actually departing from the scope of the invention. Therefore the appended claims are intended to cover all such equivalent variations as come within the true spirit and scope of the invention.

What I claim as new and desire to secure by Letters Patent of the United States is:

1. A joint structure comprising a pair of rigid cooperating surfaces adapted to be clamped together, compressible gasket means arranged on one of said rigid surfaces adapted to be compressed therebetween to form a tight seal, and combined clamping and spacing means secured to one of said surfaces for clamping said surfaces together and for limiting the compression of said gasket means therebetween, said combined means comprising a stud member projecting from the last mentioned rigid surface, an annular space member on the latter surface surrounding said stud member, said stud and spacer members being jointly welded to each other and to the latter surface, the height of said spacer member being lower than the height of said gasket means, and means coacting with said stud member for clamping said surfaces together.

2. A joint structure comprising a pair of coacting joint members adapted to be clamped together, a gasket secured to the surface of one of said joint members and adapted to be compressed therebetween, and means secured to said one joint member on opposite sides of said gasket for limiting the extent of compression of said gasket when said coacting joint members are clamped together, said means on at least one of said sides including combined fastening and spacing means comprising a threaded stud member and a ring member surrounding said stud member, said stud and ring members being jointly welded to each other and to said one joint member, and a nut threadably engaging said stud member for clamping said joint members together.

3. The method of making a joint structure including cooperating joint members adapted to have a sealing gasket compressed therebetween which method comprises arranging a stud member at the surface of one joint member with a metallic spacer ring arranged around said stud member substantially coaxially therewith, simultaneously and jointly welding the stud member and spacer ring to said one joint member, applying another joint member to said stud member for compressing said sealing gasket between the cooperating joint members, whereby the extent of compression of said sealing gasket will be limited by said spacer ring.

4. The method of making a joint structure including cooperating joint members adapted to have a sealing gasket compressed therebetween, which method comprises arranging a metallic spacer ring on one joint member with a metallic stud member adjacent the surface of said joint member substantially coaxial with said spacer ring, producing an electrical welding arc between said stud and said surface and between said stud and said spacer ring to form a molten pool of metal within said spacer ring, and pressing said stud into said molten pool to form a joint, permanent weld between said stud, said spacer ring and said one joint member, applying another joint member to said stud member for compressing said sealing gasket between the cooperating joint members, whereby the extent of compression of said sealing gasket will be limited by said spacer ring.

References Cited in the file of this patent
UNITED STATES PATENTS

| | | |
|---|---|---|
| 2,413,370 | Palmer | Dec. 31, 1946 |
| 2,459,957 | Palmer | Jan. 25, 1949 |
| 2,510,000 | Van Der Willigen et al. | May 30, 1950 |
| 2,590,803 | Unger et al. | Mar. 25, 1952 |
| 2,635,785 | Gross | Apr. 21, 1953 |
| 2,744,654 | Swerdlow | May 8, 1956 |